J. S. LYON.
CONVERTIBLE BABY BED.
APPLICATION FILED MAR. 30, 1915.
1,273,638.
Patented July 23, 1918.
6 SHEETS—SHEET 1.
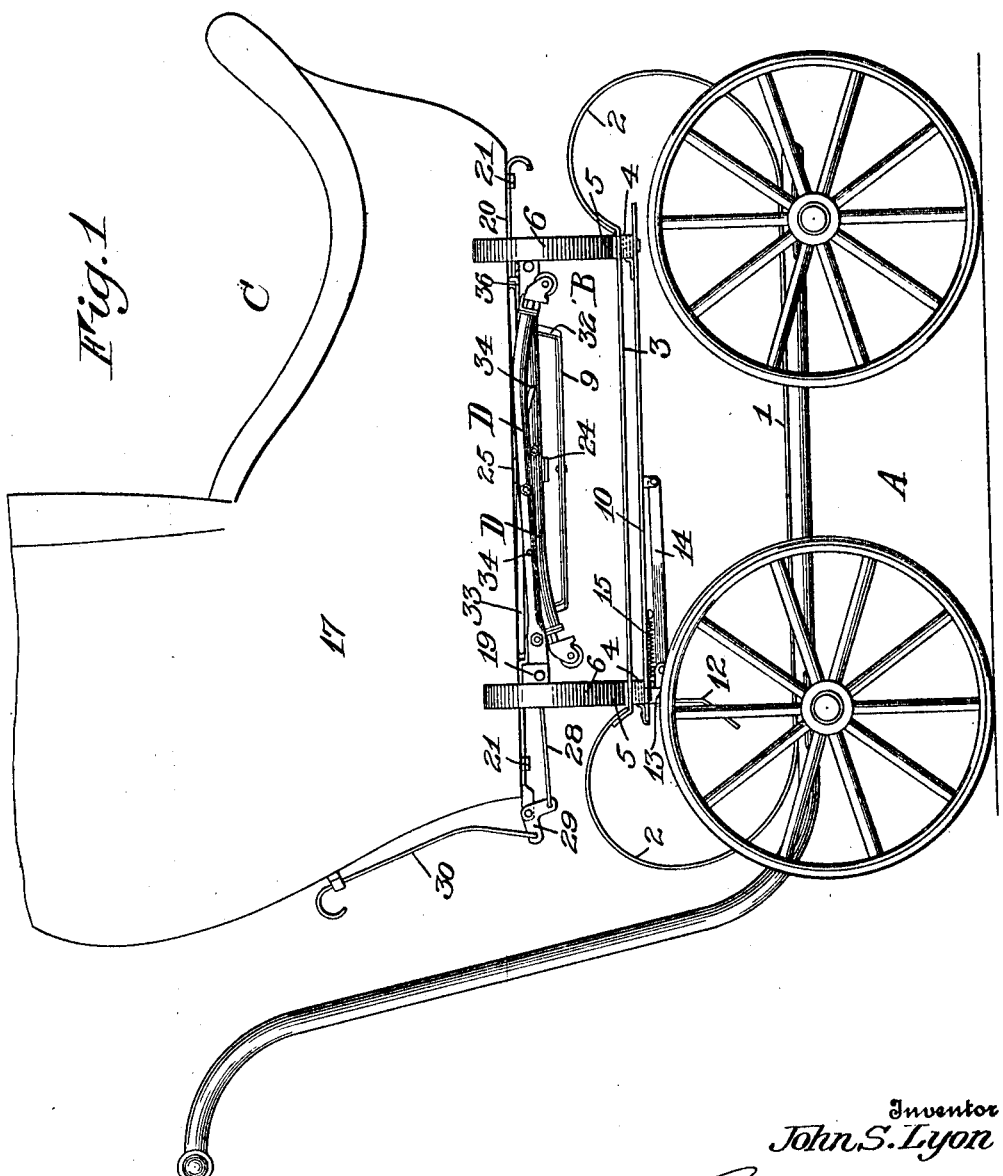

J. S. LYON.
CONVERTIBLE BABY BED.
APPLICATION FILED MAR. 30, 1915.
1,273,638.
Patented July 23, 1918.
6 SHEETS—SHEET 2.
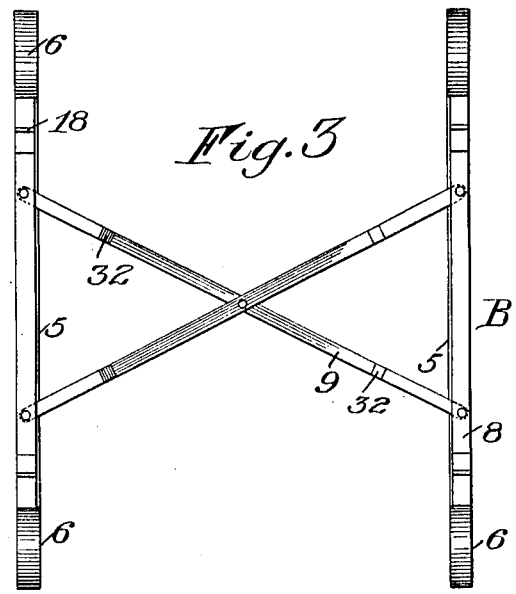
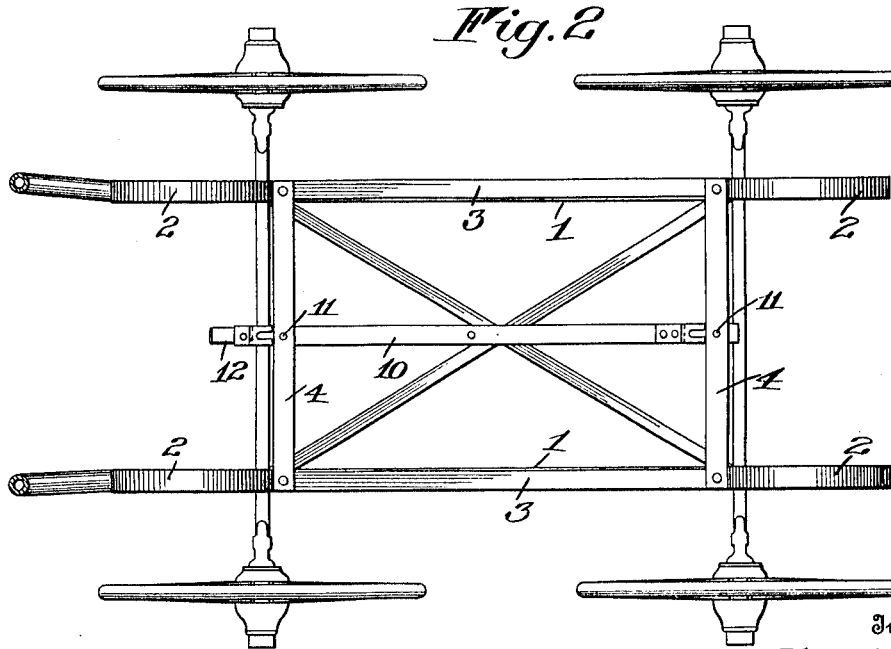
Witnesses
Walter B. Payne
Nelson H. Copp
Inventor
John S. Lyon
By
his Attorneys

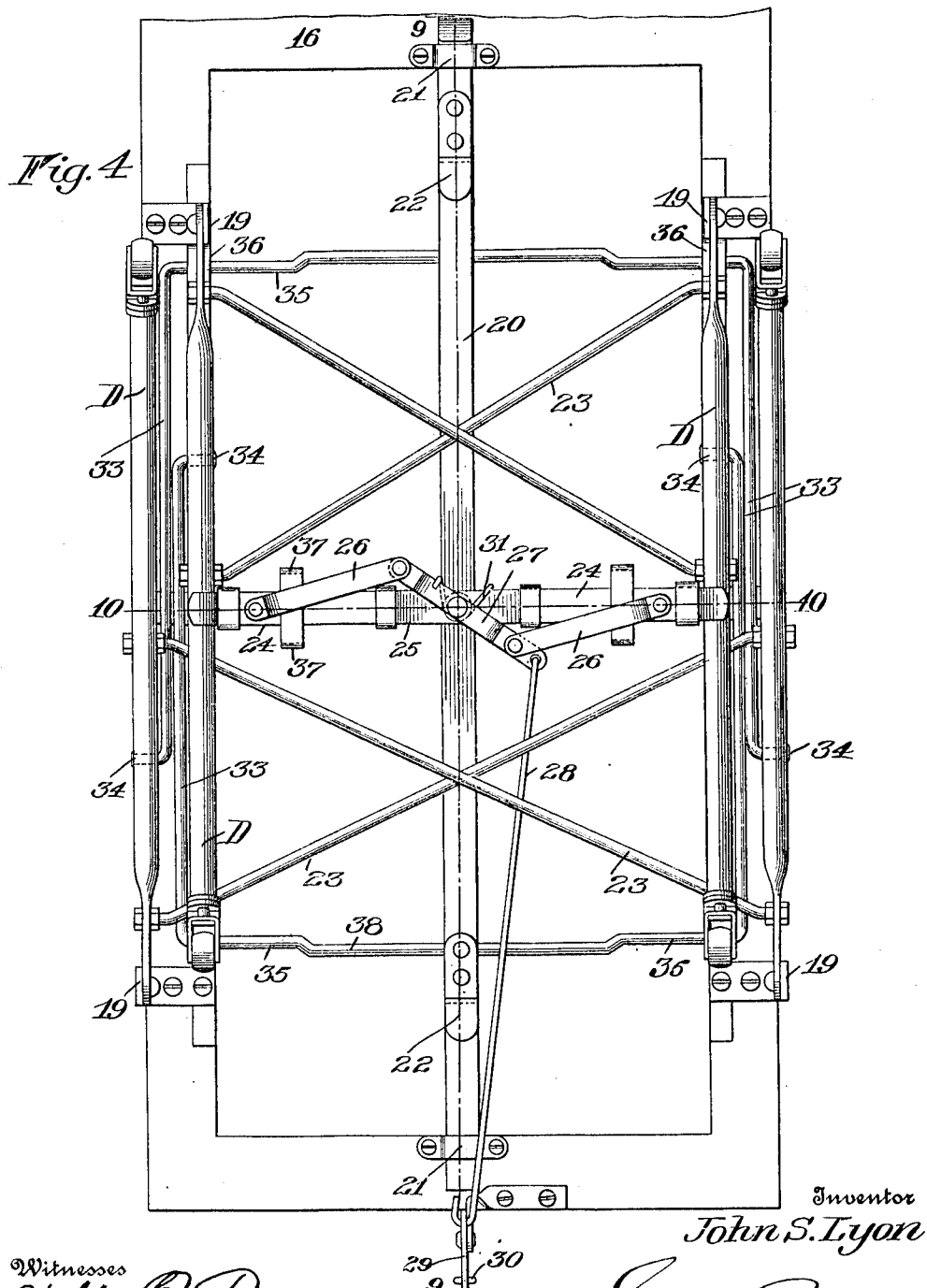

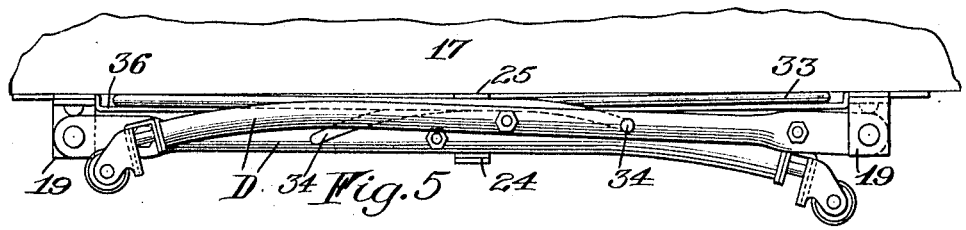
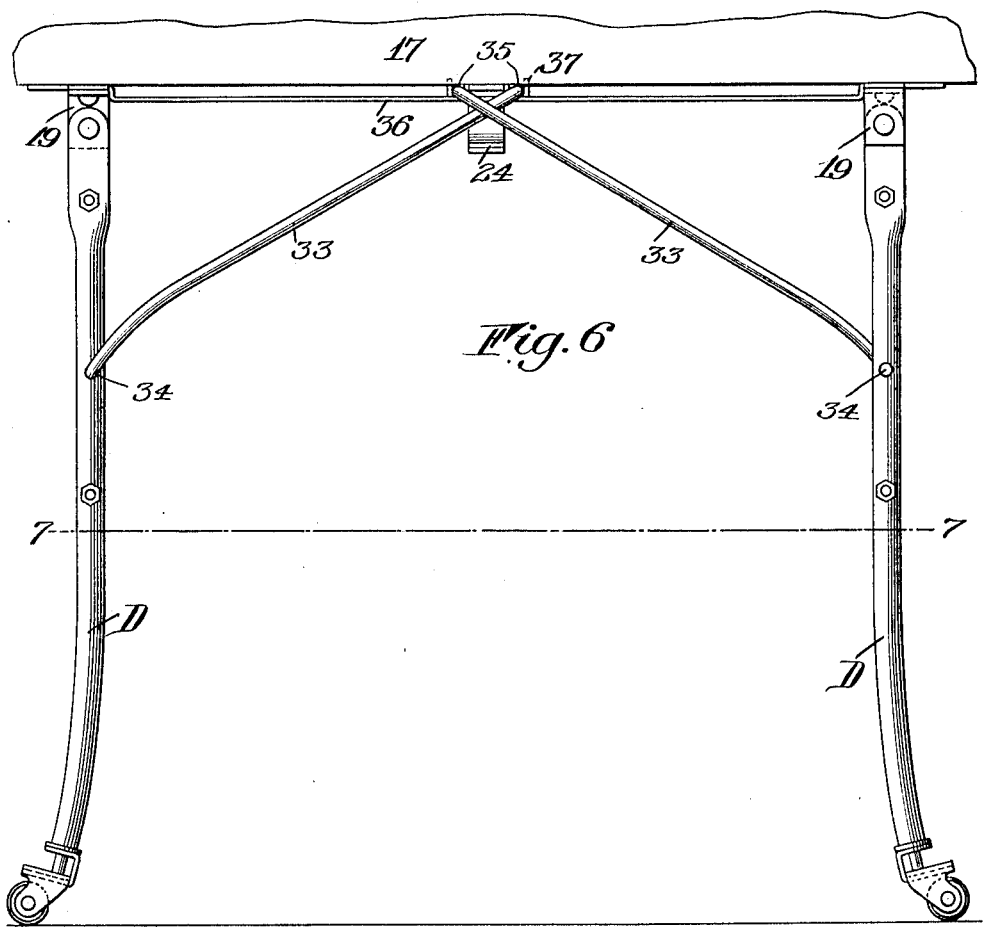

J. S. LYON.
CONVERTIBLE BABY BED.
APPLICATION FILED MAR. 30, 1915.

1,273,638.

Patented July 23, 1918.
6 SHEETS—SHEET 5.

Witnesses
Walter B. Payne
Nelson H. Copp

Inventor
John S. Lyon
By Church & Rich
his Attorneys

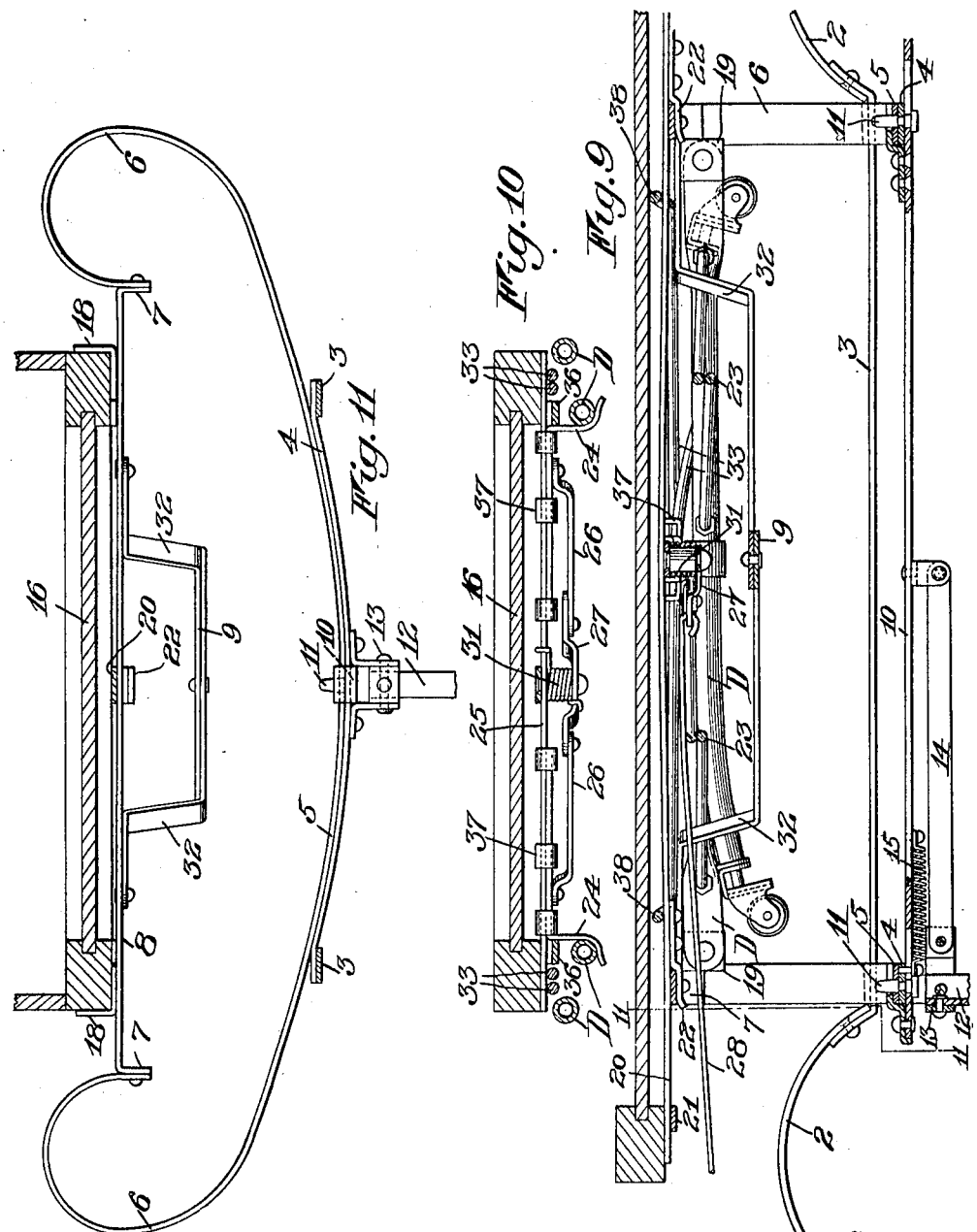

UNITED STATES PATENT OFFICE.

JOHN S. LYON, OF ROCHESTER, NEW YORK, ASSIGNOR OF ONE-HALF TO TRAUGOT C. UHLEN, OF ROCHESTER, NEW YORK.

CONVERTIBLE BABY-BED.

1,273,638.    Specification of Letters Patent.    Patented July 23, 1918.

Application filed March 30, 1915. Serial No. 18,161.

*To all whom it may concern:*

Be it known that I, JOHN S. LYON, of Rochester, in the county of Monroe and State of New York, have invented certain new and useful Improvements in Convertible Baby-Beds; and I do hereby declare the following to be a full, clear, and exact description of the same, reference being had to the accompanying drawings, forming a part of this specification, and to the reference-numerals marked thereon.

My present invention relates to baby beds, and has for its special object to provide a structure which may be readily converted for use in different capacities, such for example as a bassinet, a cradle or a baby carriage. To these and other ends the invention consists in certain improvements and combinations of parts all as will be hereinafter more fully described, the novel features being pointed out in the claims at the end of the specification.

In the drawings:

Figure 1 is a side elevation of a combination baby carriage illustrating one embodiment of my invention;

Fig. 2 is a plan view of the running gear thereof;

Fig. 3 is a plan view of the rocker section detached;

Fig. 4 is an enlarged bottom view of the carriage body detached, showing the supporting legs in folded position;

Fig. 5 is an elevation of the body with the legs folded;

Fig. 6 is a similar view with the legs extended;

Fig. 9 is a longitudinal section on the line 9—9 of Fig. 4;

Fig. 10 is a transverse sectional view on the line 10—10 of Fig. 4, and

Fig. 11 is a sectional view on the line 11—11 of Fig. 9.

Similar reference characters in the several figures indicate the same parts.

Figure 7:
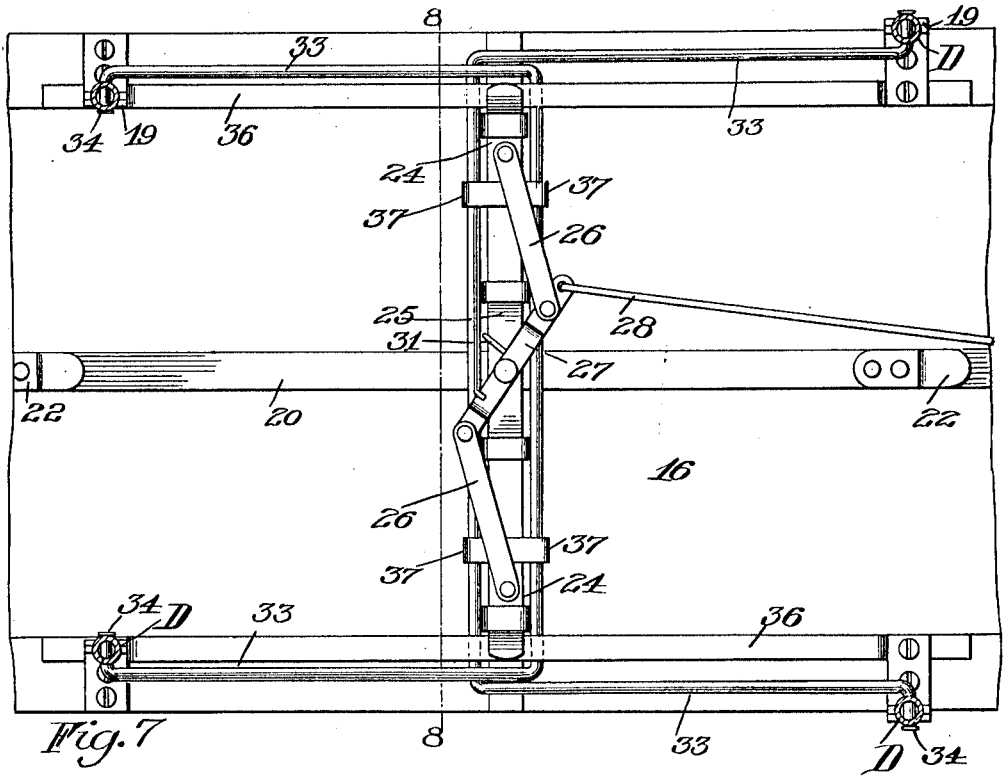
Fig. 7 is a horizontal sectional view on the line 7—7 of Fig. 6.

In the present embodiment of my invention I provide a baby carriage consisting of a body, a running gear and a rocker section interposed between the body and running gear, and secured to both parts by detachable connections whereby the body may be disconnected from the rocker section and used as a bassinet, the body being for the purpose provided with collapsible legs which may be extended to support it at the desired height above the floor, or the rocker may be disconnected from the running gear and remain connected to the body, adapting the latter for use as a cradle.

In the drawings, the running gear A is shown provided with the longitudinally extending parallel springs, each composed of a straight portion 1 curved upwardly at each end to form loops 2 which are connected by a bar 3, the bars 3 being braced by transversely extending bars 4 which are curved to conform to and offer seats for the reception of the rockers of the rocker section.

The rocker section B consists of parallel strips 5 of elastic material, such as metal curved in the shape of rockers, and at their ends bent into loops 6 which are secured to the offset ends 7 of straight bars 8, which latter are rigidly connected by crossing braces 9. The rocker section is secured to the running gear by a sliding locking member 10 which is guided beneath the bars 4 and provided with offset fingers adapted to engage above the rockers 5, and secure the latter against removal, while pins 11 on the bars 4, projecting through apertures in the rockers, prevent sliding motion thereof. An operating lever 12 pivoted at 13 in a depending bracket on one of the cross bars 4 of the running gear is connected by a link 14 to the bolt 10, and serves to move said bolt to locking position against the tension of a spring 15.

The body C consists of the bottom 16 covered by a hood 17 of any desired style and rests upon and is adapted to be secured to the rocker section. To this end the bars 8 of the rocker section which extend transversely of the carriage are provided with lugs 18 engaging opposite sides of the body and preventing lateral motion thereof, while longitudinal motion is prevented by brackets 19 on the under side of the body, engaging the inner edges of the bars 8. A locking bolt 20 slidingly mounted in guides 21 on the bottom 16 and provided with offset fingers 22 which engage beneath the bars 8 prevents the accidental removal of the body.

When it is desired to utilize the body as a cradle, it is only necessary to operate the lever 12, thereby disengaging the bolt 10 from the rockers 5 and permitting the removal of the rocker section with the body.

It is sometimes desirable to utilize the body portion alone as a bassinet, and I therefore provide legs D on the bottom 16, which are normally folded when the body portion is connected to the rocker section, but which may be extended to support it at a convenient height above the floor when the body is disengaged from the rocker section. The legs D are four in number and arranged in pairs connected by crossing brace bars 23 and pivoted on the brackets 19 depending from the bottom 1 of the body near the ends thereof. The legs of the two pairs are offset so as to clear each other when in folded position, as shown in Fig. 4, the brace bars of one pair being engaged by and held securely by the other pair, which in turn is held locked by bolts 24 slidingly mounted on a guiding bar 25 extending transversely of the body. The bolts are simultaneously operated to withdraw them from engagement with the legs by links 26 connected to the bolts and to opposite ends of a lever 27 pivoted on the bar 25, said lever 27 being connected by a link 28 to a bell crank lever 29 at the rear end of the body, the bell crank 29 being operated by a pull rod 30 guided on the rear of the hood. The bolts are actuated to locking position by a coiled spring 31 surrounding the pivot of the lever 27, one end of the spring engaging the lever and the other end the bar 25.

When the body is secured in place on the rocker section, interference of the folded legs with the cross bars 9 is obviated by offsetting the latter downwardly, as indicated by 32 in Figs. 1 and 9.

Figure 8:
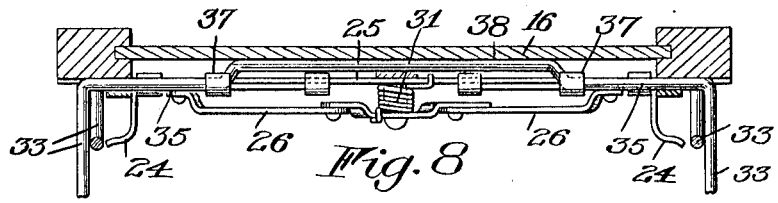
Fig. 8 is a transverse sectional view on the line 8—8 of Fig. 7.

The legs are secured in extended position by braces comprising parallel portions 33 pivoted at their outer ends to the legs at the points 34 and connected by the transversely extending portions 35, which are movable beneath guiding strips 36, on either side of the body, and spaced therefrom. The braces 33 cross, as shown in Fig. 6, and in the position shown in said figure are securely locked by offset stops 37 on the bolts 24 which engage the outer sides of the transversely extending portions 35 and hold the latter firmly in engagement with the opposite sides of the bolts 24. The transverse portions 35 are offset upwardly, as shown at 38 in Fig. 8, so that the stops 37 will clear them when the bolts are withdrawn, thereby allowing the folding of the legs.

It will be seen from the above description that I have provided a combination carriage, cradle and bassinet which is readily convertible for use in any one of these capacities, and in which efficiency of operation is not obtained at the expense of convenience or appearance.

The invention claimed is:

1. In a convertible bed, the combination with a body portion, a running gear including a pair of springs supporting the body and ranging lengthwise one at each side thereof, and a pair of resilient rockers detachably secured to the body springs and disposed at about right angles thereto and forming auxiliary springs during use of the structure as a carriage.

2. In a convertible bed, the combination with a body portion, a running gear including a pair of springs supporting the body and ranging lengthwise one at each side thereof, a pair of transverse concaved cross bars connecting opposite ends of the two body springs, and a pair of transverse resilient rockers detachably secured to the cross bars and disposed at about right angles to the body springs and forming auxiliary springs during use of the structure as a carriage.

3. In a convertible baby bed, the combination with a running gear having springs, of a rocker section detachably secured to the springs, a body portion detachably secured to the rocker section, and a support for the body portion connected directly to the latter and movable thereon independently of the rocker section.

4. In a convertible bed, the combination with a running gear having springs, and cross bars connecting the springs, of a rocker section embodying a pair of rockers and a body portion carried by the rocker section, the rocker section being secured to the cross bars through the medium of the rockers.

5. In a convertible bed, the combination with a running gear portion having parallel springs connected by cross bars, of a body portion provided with rockers formed of metal strips bent flatwise, the cross bars being bent to conform to the shape of the rockers, and the body portion resting on the running gear portion with the rockers in engagement with the cross bars, and a locking member carried by one portion and coöperating with the other to lock them in engagement.

6. In a convertible bed, the combination with a carriage portion having parallel springs, connected by cross bars, of a rocker section embodying flexible rockers having loops at their ends, said rockers adapted to seat against said cross bars, a connecting bar between the ends of each rocker, braces between the connecting bars, a body portion adapted to engage the connecting bars, and prevented from motion thereon by cooperating stop portions on the said engaging parts, and locking members for locking the rocker section to both the body portion and carriage portion.

7. In a convertible bed, the combination with a running gear having parallel springs, a rocker section having rockers which rest on the springs and extend transversely thereof, means for detachably connecting the rocker section to the springs, and a body portion carried by the rocker section.

8. In a convertible bed, the combination with a running gear, a rocker section resting thereon, a body portion resting on the rocker section, folding legs on the body portion adapted to be extended to support the body portion and movable independently of the rocker section, and means for detachably securing the rocker section to the body portion in order to permit the latter to be removed and the legs extended.

9. In a convertible bed, the combination with a running gear portion having parallel springs connected by cross bars, of a body portion provided with rockers seated on the cross bars and bearing against the latter at points to either side of the center of the rockers, means coöperating with the rockers between the bearing points to hold them against removal from the cross bars, and coöperating shoulders on the cross bars and rockers to prevent relative slipping.

JOHN S. LYON.

Witnesses:
  RUSSELL B. GRIFFITH,
  WALTER B. PAYNE.

Copies of this patent may be obtained for five cents each, by addressing the "Commissioner of Patents, Washington, D. C."